US00RE47888E

(19) United States
(12) Reissued Patent
Lee et al.

(10) Patent Number: US RE47,888 E
(45) Date of Reissued Patent: Mar. 3, 2020

(54) TOUCH SYSTEM WITH TRACK DETECTING FUNCTION AND METHOD THEREOF

(71) Applicant: PixArt Imaging Inc., Hsin-Chu (TW)

(72) Inventors: Yi-Fang Lee, Hsin-Chu (TW); Yao-Hsuan Lin, Hsin-Chu (TW)

(73) Assignee: PIXART IMAGING INC., Hsin-Chu (TW)

(21) Appl. No.: 16/131,207

(22) Filed: Sep. 14, 2018

Related U.S. Patent Documents

Reissue of:
(64) Patent No.: 9,619,072
Issued: Apr. 11, 2017
Appl. No.: 13/295,098
Filed: Nov. 14, 2011

(30) Foreign Application Priority Data

Aug. 30, 2011 (TW) ..... 100131079

(51) Int. Cl.
*G06F 3/041* (2006.01)

(52) U.S. Cl.
CPC ..... *G06F 3/0416* (2013.01)

(58) Field of Classification Search
CPC ..... G06F 3/0416
See application file for complete search history.

(56) References Cited

U.S. PATENT DOCUMENTS 4,734,685 A * 3/1988 Watanabe ..... G06F 3/0317 345/157
5,327,161 A * 7/1994 Logan et al. ..... 345/157
5,661,502 A * 8/1997 Cheng ..... G06F 3/038 345/159
5,825,351 A * 10/1998 Tam ..... G06F 3/044 345/173
5,956,019 A * 9/1999 Bang ..... G06F 3/03547 345/157
6,323,846 B1 * 11/2001 Westerman et al. ..... 345/173
(Continued)

FOREIGN PATENT DOCUMENTS

CN 101751195 A 6/2010
CN 101833383 A 9/2010
(Continued)

OTHER PUBLICATIONS

Appendix 1 of U.S. Pat. No. 8,692,767.*
Appendix 2 of U.S. Pat. No. 8,692,767.*

*Primary Examiner* — Colin M LaRose
(74) *Attorney, Agent, or Firm* — WPAT, PC

(57) ABSTRACT

A touch system with track detecting function includes a touch pad for sequentially sensing a plurality of positions of an indication object at a plurality of moments in order to detect a track of the indication object on the touch pad, and a processor for continuously generating motion vectors according to the track of the indication object on the touch pad, for generating a candidate motion vector according to at least one motion vector, and for nonlinearly generating a target motion vector according to the candidate motion vector in order to move a target shown on a display panel. Each of the motion vectors represents a difference between a position of the indication object and a next position of the indication object.

10 Claims, 4 Drawing Sheets

(56) References Cited

U.S. PATENT DOCUMENTS

| | | | | |
|---|---|---|---|---|
| 7,167,162 | B2 * | 1/2007 | Gordon | G06F 3/03547 345/156 |
| 7,324,088 | B2 * | 1/2008 | Lin | G06F 3/0317 345/163 |
| 8,692,767 | B2 * | 4/2014 | Day | G06F 3/04812 345/157 |
| 2003/0169239 | A1 * | 9/2003 | Nakano et al. | 345/173 |
| 2006/0159177 | A1 | 7/2006 | Mellot | |
| 2007/0097093 | A1 * | 5/2007 | Ohshita et al. | 345/173 |
| 2008/0055275 | A1 | 3/2008 | Orsley | |
| 2009/0265658 | A1 * | 10/2009 | Klishko et al. | 715/786 |
| 2010/0103191 | A1 * | 4/2010 | Chen | G06F 3/0317 345/611 |
| 2011/0050607 | A1 * | 3/2011 | Park | 345/173 |

FOREIGN PATENT DOCUMENTS

| | | | |
|---|---|---|---|
| CN | 101833389 | A | 9/2010 |
| CN | 101957721 | A | 1/2011 |
| CN | 102073401 | A | 5/2011 |
| CN | 102117141 | A | 7/2011 |
| CN | 102163096 | A | 8/2011 |

* cited by examiner

TOUCH SYSTEM WITH TRACK DETECTING FUNCTION AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue of U.S. Pat. No. 9,619,072 B2, issued on Apr. 11, 2017, which is a U.S. Utility patent application Ser. No. 13/295,098, filed on Nov. 14, 2011, which is based upon and claims the benefit of priority to Taiwanese Patent Application No. 100131079 A, filed on Aug. 30, 2011. The disclosures of the above-listed applications are hereby incorporated by reference herein in their entirety.*

BACKGROUND OF THE INVENTION

1. Field of the Invention

The present invention relates to a touch system, and more particularly, to a touch system with track detecting function.

2. Description of the Prior Art

In a traditional touch system, a target shown on a display panel (such as a cursor) is moved according to movements of a finger on a touch pad. In the prior art, a moving distance of a user's finger is normally equal to a moving distance of the cursor. In other words, a size of the touch pad needs to be the same size as the display panel, which would increase the cost. The moving distance of the cursor needs to be a predetermined times of the moving distance of the finger for reducing the size of the touch pad. However, accuracy of the touch pad is reduced as well. Take a touch pad with a width of X for example. If the user tries to move the cursor a distance of 2×, the finger is needed to move on the touch pad a distance of X twice. Or, a resolution of the touch pad must be reduced, such that the cursor is moved the distance of 2× accordingly when the finger moves on the touch pad the distance of X once. But such arrangement reduces accuracy of the touch pad. Therefore, manufacturers of the touch system of the prior art faces a dilemma of increasing cost or reducing accuracy.

SUMMARY OF THE INVENTION

The present invention provides a touch system with track detecting function and a method thereof. The touch system comprises a touch pad for sensing a track of an indication object to generate a target motion vector in order to move a target shown on a display panel smoothly along a desired direction. The present invention can determine an inertial motion of the indication object, such that when the indication object stops moving, the target can continue to move according to the inertial motion of the indication object. The target can be moved in a predetermined time or moved with an increasing speed or a decreasing speed according to the inertial motion of the indication object.

Furthermore, according to the present invention, the target shown on a display panel is moved along a smooth track according to the target motion vectors.

The present invention obtains the target motion vector of the target by a nonlinear function according to a plurality of motion vectors generated by the indication object to. Therefore, the motion vectors of the indication object are needed to be obtained continuously in the present invention.

The present invention further provides a method for controlling a touch system. The method comprises sensing a track of an indication object for generating a first and a second motion vectors; generating a candidate motion vector according to the first and the second motion vectors, and generating a target motion vector according to the candidate motion vector; and moving a target according to the target motion vector; wherein the indication object is positioned on a touch pad of the touch system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
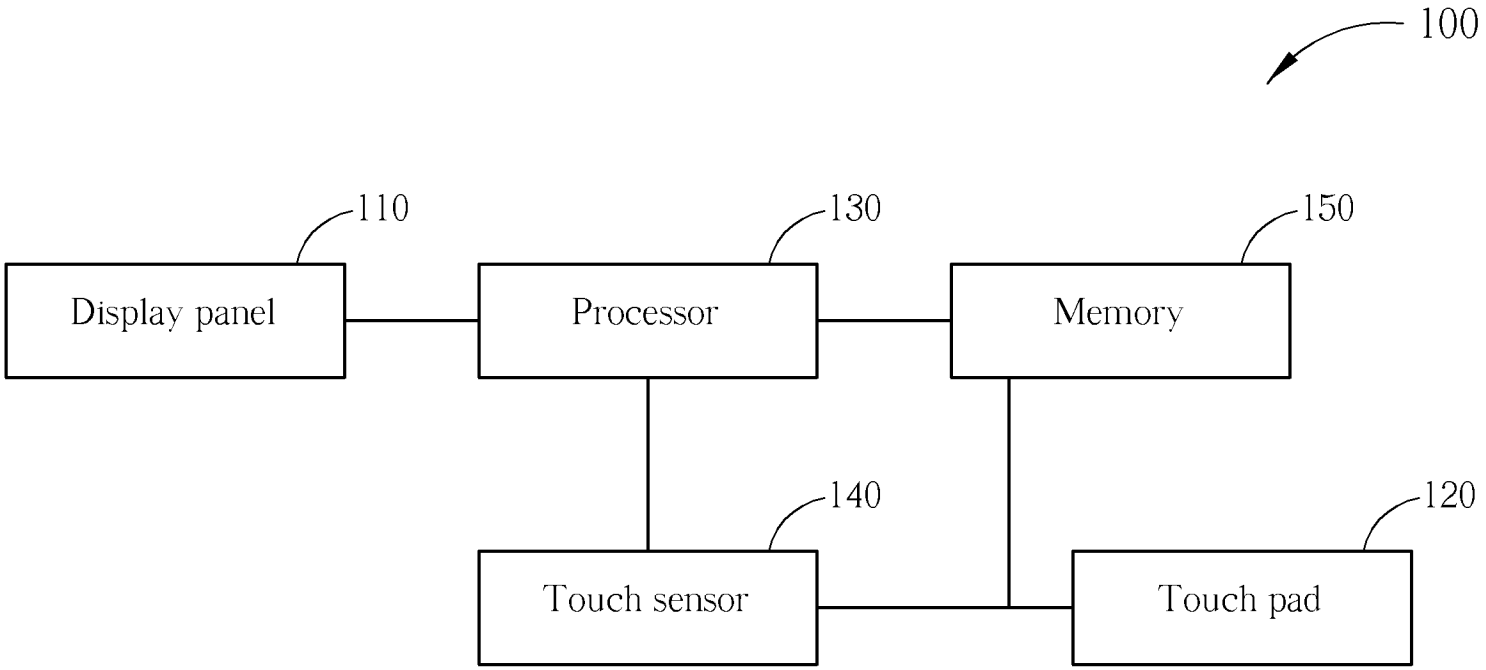
FIG. 1 is a diagram showing a touch system with track detecting function of the present invention.
Figure 2:
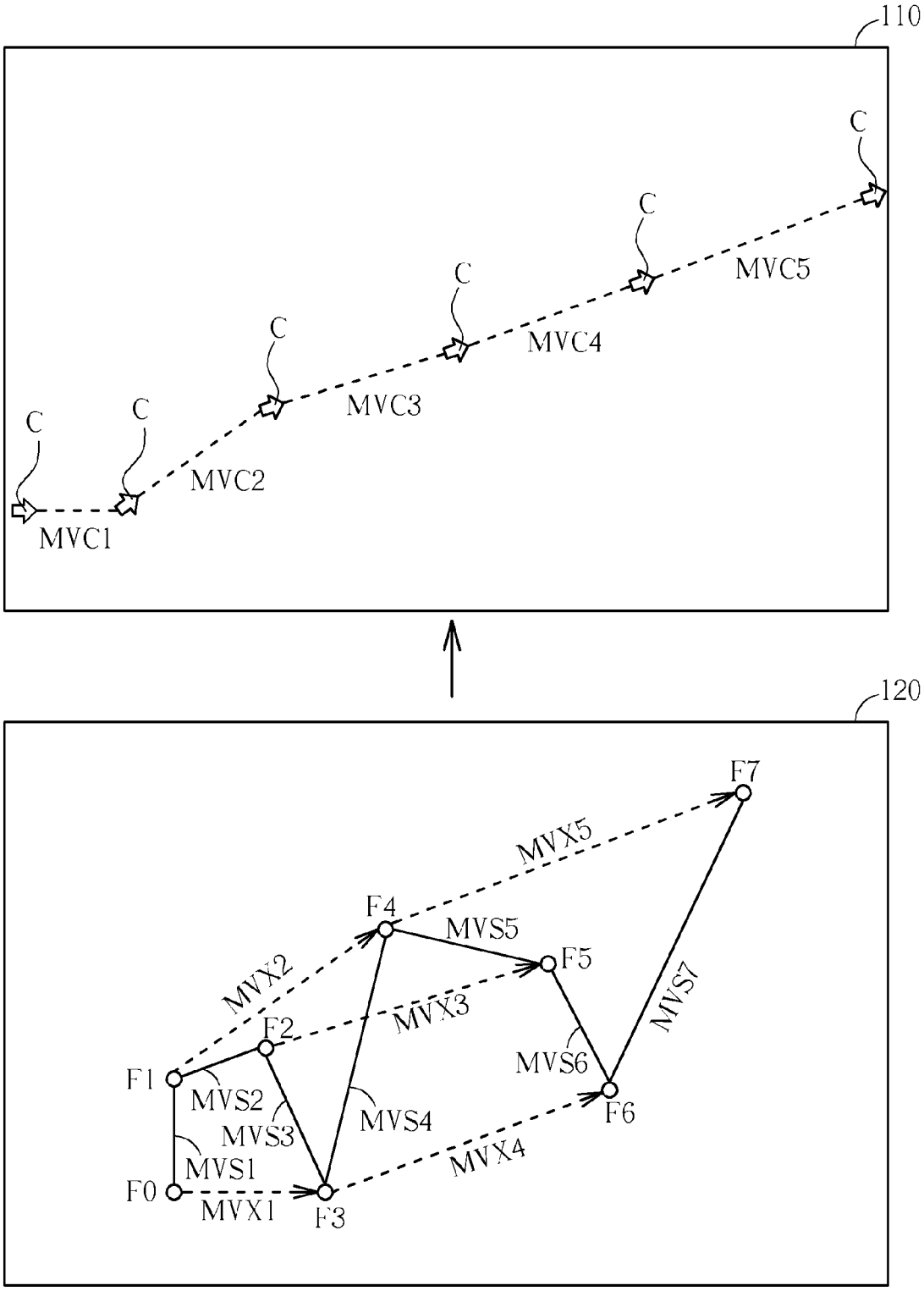
FIG. 2 is a diagram showing the touch system moving a target according to a plurality of motion vectors of an indication object.

Please refer to FIG. 1 and FIG. 2. FIG. 1 is a diagram showing a touch system 100 with track detecting function of the present invention. FIG. 2 is a diagram showing the touch system moving a target according to a plurality of motion vectors of an indication object. The touch system 100 comprises a display panel 110, a touch pad 120, a processor 130, a touch sensor 140, and a memory 150. The touch pad 120 is for sensing a track of an indication object F (such as a finger) moving on the touch pad. The touch sensor 140 is for determining whether the indication object is on the touch pad 120. The memory 150 is for receiving and storing the information of the track sensed by the touch pad 120, and for providing the information of the track to the processor 130. When the processor 130 receives the information of the track stored in the memory 150, the processor 130 moves a target C (such as a cursor) on the display panel 110 after computing the track according to a predetermined function. That is, when the indication object F is moved along a direction of an X vector on the touch pad 120, the target C is moved according to a function f (X), wherein f (X) is a function of X and can be a nonlinear function, and X vector is a continuous motion vector.

The touch pad 120 continuously detects the track of the indication object F moving on the touch pad 120. Note that a size ratio between the touch pad 120 and the indication object F does not affect the detecting result. As long as the touch pad 120 continuously detects the track of the indication object F, a target motion vector can be generated.

The below embodiment illustrates how the present invention detects the track of the indication object and generates target motion vectors. In the embodiment, the touch pad 120 samples the track of the indication object F moving on the touch pad with a sampling frequency FS, and obtains a plurality of motion vectors MVS. More particularly, compared to a moving speed of the indication object F, the sampling frequency FS is fast enough to obtain more moving information of the indication object F. The processor 130 generates target motion vectors MVC for moving the target C on the display panel 110 according to the received motion vectors MVS.

In the present invention, the processor 130 generates the target motion vector MVC of the target C according to at least one motion vector MVS. For example, the touch pad 120 samples at moments T0, T1, T2, T3, and obtains the motion vectors MVS1, MVS2, MVS3 respectively. The processor 130 then generates the target motion vectors MVC according to the motion vectors MVS1, MVS2, MVS3. The greater the motion vectors MVS1, MVS2, MVS3 (which means the indication object F moves faster) are, the greater (or less) the target motion vector MVC will be. In addition, if the indication object F stops moving or stops for a period of time, the processor 130 can move the target C at a predetermined speed or with a decreasing speed according to a direction from a start point of the motion vector MVS1 to a end point of the motion vector MVS3 and variation of the motion vectors MVS1, MVS2, MVS3. Similarly, if the touch sensor 140 determines that the indication object F is not on the touch pad 120 at the moment T3, the processor 130 can move the target C in a predetermined time or with a decreasing speed according to the direction from the start point of the motion vector MVS1 to the end point of the motion vector MVS3 and the variation of the motion vectors MVS1, MVS2, MVS3.

The present invention can be utilized in a product with a touch pad larger or smaller than a touched area of the indication object. Take a portable electronic device with a touch pad for example, if the size of the touch pad is much larger than the touched area of the indication object, it is not convenient for a user to move a finger through the whole touch pad. The processor can generate target motion vectors according to a plurality of motion vectors when the user moves his finger on a partial area of the touch pad. Take another electronic device with a finger navigation module (such as a mobile phone or a computer) for example, if the size of the finger navigation module is equal to or smaller than the touched area of the indication object, it is not convenient for the user to move the finger repeatedly for moving a target (such as a cursor) a longer distance. The processor can generate target motion vectors according to a plurality of motion vectors when the user moves his finger on the finger navigation module.

As shown in FIG. 2, the touch pad 120 sequentially samples at the moments T0, T1, T2, T3, T4, T5, T6, T7 to obtain touched positions F0, F1, F2, F3, F4, F5, F6, F7 of the indication object F, and the motion vectors MVS1, MVS2, MVS3, MVS4, MVS5, MVS6, MVS7 respectively. The motion vectors MVS1~MVS7 are temporarily stored in the memory 150. The processor 130 sums up the motion vectors MVS1~MVS7 for generating candidate motion vectors MVX. For example, MVX1 is a summation of MVS1, MVS2, and MVS3; MVX5 is a summation of MVS5, MVS6, and MVS7. The processor 130 then substitutes the candidate motion vector MVX in a predetermined function f(MVX) for generating the target motion vector MVC of the last target C in order to move the target C, wherein f(MVX) can be a linear or a nonlinear function. Or the processor 130 can find out the target motion vector MVC of the target C corresponding to the candidate motion vector MVX according to a look-up table in order to move the target C. For example, the function f(MVX) can be set as $MVC=(MVX)^2$. Therefore, the larger the absolute value (the moving distance) of the candidate motion vector MVX is, the larger the absolute value (the moving distance) of the target motion vector MVC will be.

In the embodiment of FIG. 2, the processor 130 sums up the consequent 3 motion vectors MVS for generating the candidate motion vector MVX. For example, MVX1 is a summation of MVS1, MVS2, and MVS3; MVX5 is a summation of MVS5, MVS6, and MVS7. The target motion vector MVC is then generated according to the function f (MVX). For better illustration, assuming MVC=f (MVX) =MVX. According to the above equation, the motion vectors MVC1, MVC2, MVC3, MVC4, MVC5 of the target C are respectively equal to the candidate motion vectors MVX1, MVX2, MVX3, MVX4, MVX5 at moments T3, T4, T5, T6, T7. As shown in FIG. 2, the method for determining the motion vector of the target according to a plurality of motion vectors of the indication object can reduce interference caused by noises generated from the indication object or the touch pad in order to move the object smoothly. For example, if the indication object is a finger of a user, the finger may slightly shake when moving on the touch pad. In the present invention, the target shown on the display panel can move along a smoother track without shaking.

In addition, the processor 130 determines whether the indication object F stops moving according to the latest motion vectors provided by the touch pad 120. In the embodiment, the processor 130 determines whether the indication object F stops moving according to the candidate motion vector MVX5. If the candidate motion vector MVX5 is smaller than a predetermined value MVP, the processor 130 determines the indication object F stopped moving. In this case, after the target C is moved according to the target motion vector MVC5, the processor 130 further moves the target C at a predetermined speed VP. If the candidate motion vector MVX5 is smaller than the predetermined value MVP and the touch sensor 140 determines the indication object F not on the touch pad 120, the target C is moved by the processor 130 along a direction of the target motion vector MVC5, and then the processor 130 moves the target C for a predetermined time TP, or moves the target C with a decreasing speed till to zero (inertial motion). For example, a speed equation can be set as V(t)=VO5−Ct, wherein VO5 is the speed of the target C moving along the direction of the target motion vector MVC5, C is a constant, t is time.

Figure 3:
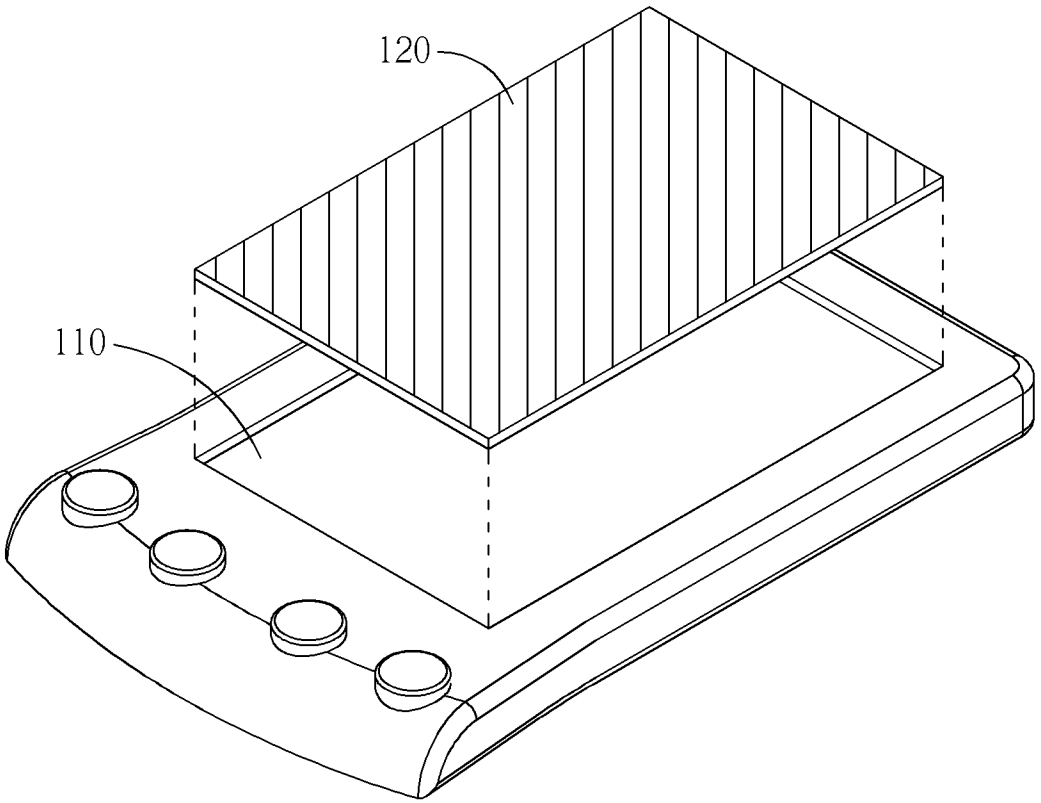
FIG. 3 is an embodiment showing a touch pad and a display panel of the touch system of the present invention.
Figure 4:
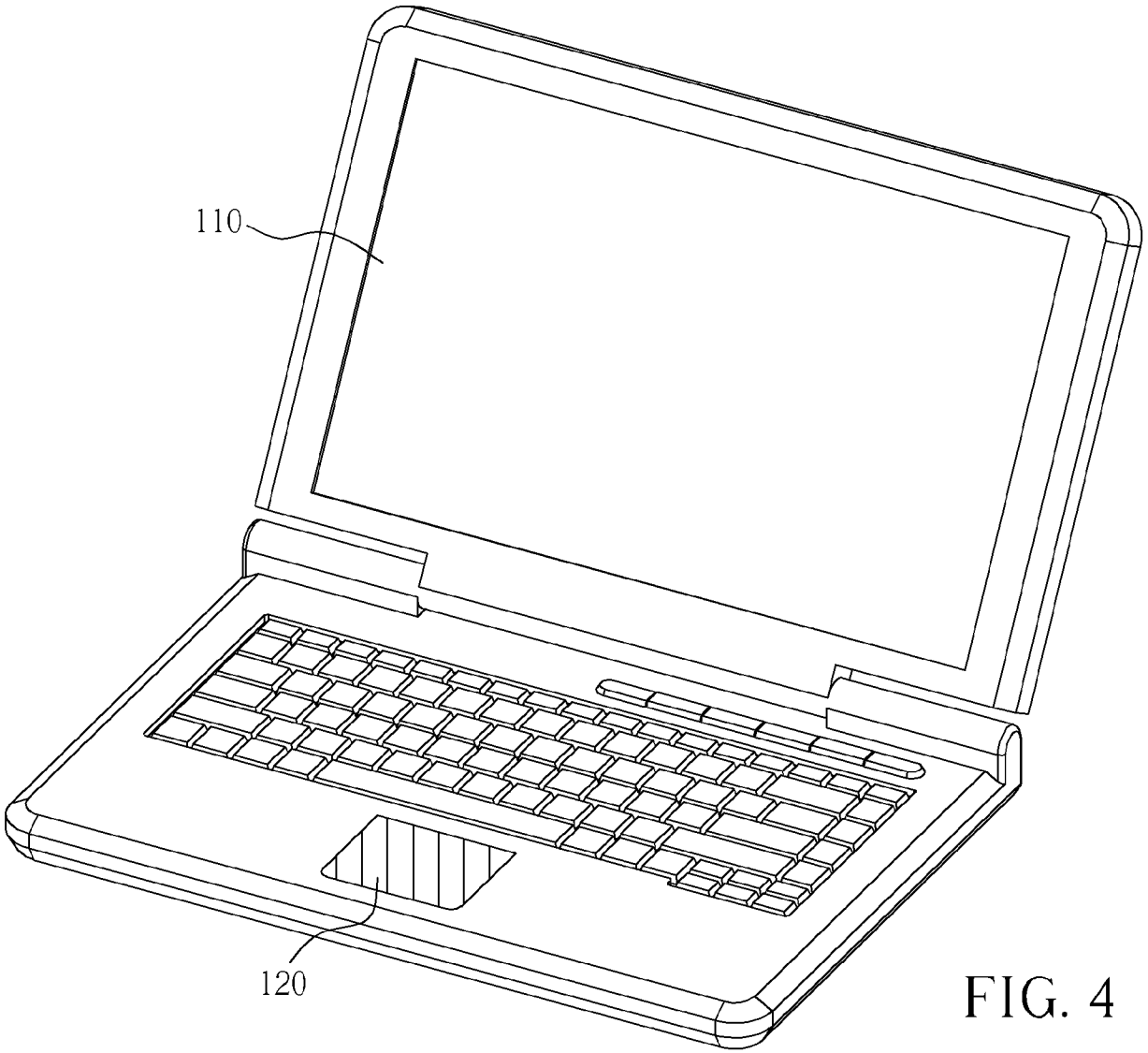
FIG. 4 is another embodiment showing a touch pad and a display panel of the touch system of the present invention.

Please refer to FIG. 3 and FIG. 4. FIG. 3 is an embodiment showing a touch pad and a display panel of the touch system of the present invention. FIG. 4 is another embodiment showing a touch pad and a display panel of the touch system of the present invention. FIG. 3 shows that there is an overlapping area between the touch pad 120 and the display panel 110, that is, the touch pad 120 is arranged above the display panel 110. Such embodiment is frequently applied to a smart phone. FIG. 4 shows that there is no overlap between the touch pad 120 and the display panel 110. Such embodiment is frequently applied to a laptop computer. The touch system 100 of the present invention can be implemented as shown in FIG. 3 or FIG. 4, which can be applied to the smart phones, laptop computers, or other electronic devices. According to FIG. 3, the function f(MVX) computed by the processor 130 can be a linear function. The target motion vector MVC can be equal to the candidate motion vector MVX, that is, the moving distance of the indication object F is equal to the moving distance of the target C. According to FIG. 4, the function f(MVX) computed by the processor 130 can be a nonlinear function. The target motion vector MVC is greater than the candidate motion vector MVX, that is, the moving distance of the indication object F is X, the moving distance of the target C is Y, and Y is greater than X.

In addition, the touch pad of the touch system of the present invention can be an optical type, a resistive type, a capacitive type, or other type touch pad according to design requirements. When the touch pad has a touch detection function, such as a resistive touch pad or a capacitive touch pad, the touch system can operate without the touch sensor.

Summarizing the above, the touch system of the present invention obtains a plurality of the motion vectors of the indication object to linearly or nonlinearly move the target shown on the display panel, effectively increasing a signal to noise ratio (SNR) of the touch system. In addition, when the indication object stops moving or is not on the touch pad, the touch system of the present invention continues to move the target as an inertial motion, which brings more conveniences.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a touch system, comprising:

sensing a track of an indication object on a touch pad;

continuously obtaining motion vectors according to the track of the indication object;

generating a candidate motion vector by summing a plurality of unweighted motion vectors, and nonlinearly generating a target motion vector [according to] *by converting* the candidate motion vector *to the target motion vector according to a nonlinear function*;

moving a target shown on a display panel according to the target motion vector, wherein a displayed track over which the target is moved on the display panel represents a smoother version of the track of the indication object on the touch pad; and when the candidate motion vector is smaller than a predetermined value, determining the indication object being on any area of the touch pad stopped moving, and continuing to move the target along a direction of the candidate motion vector;

wherein each of the motion vectors represents a moving distance and a moving direction from a position of the indication object to a next position of the indication object, and the indication object is on the touch pad of the touch system.

[2. The method of claim 1, wherein nonlinearly generating the target motion vector according to the candidate motion vector, comprises:

converting the candidate motion vector to the target motion vector according to a nonlinear function.]

3. The method of claim 1, wherein when the candidate motion vector is smaller than the predetermined value, determining the indication object being on any area of the touch pad stopped moving, and continuing to move the target along the direction of the candidate motion vector comprises:

when the candidate motion vector is smaller than the predetermined value, continuously moving the target along the direction of the candidate motion vector at a predetermined speed;

wherein the predetermined speed is directly proportional to the magnitude of the candidate motion vector.

4. The method of claim 1, further comprising determining whether the indication object is still on the touch pad.

5. The method of claim 4, wherein determining whether the indication object is still on the touch pad comprises:

when determining the indication object not on the touch pad, moving the target according to the target motion vector, and then moving the target in a predetermined time.

6. The method of claim 4, wherein determining whether the indication object is still on the touch pad comprises:

when determining the indication object not on the touch pad, moving the target according to the target motion vector, and then moving the target with a decreasing speed from an original speed when moving the target.

*7. A touch system, comprising:*

*a touch pad, configured to successively obtain a first motion vector and a second motion vector according to a track of an indication object moving thereon;*

*a display panel, configured to show a cursor thereon; and*

*a processor, configured to*

*relatively move the cursor on the display panel according to a target motion vector generated according to the first motion vector and the second motion vector,*

*determine a inertial vector which has a speed and a direction from a start point of the first motion vector to an end point of the second motion vector, and*

*continuously move the cursor on the display panel by the inertial vector after the indication object stops moving, at the end point of the second motion vector, on the touch pad.*

*8. The touch system as claimed in claim 7, wherein the target motion vector is nonlinearly generated according to a candidate motion vector, and the candidate motion vector is generated by summing the first motion vector and the second motion vector.*

*9. The touch system as claimed in claim 7, wherein the speed is determined according to a variation of the first motion vector and the second motion vector.*

*10. A touch system, comprising:*

*a touch pad, configured to successively obtain a first motion vector and a second motion vector according to a track of an indication object moving thereon;*

*a display panel, configured to show a cursor thereon; and*

*a processor, configured to*

*relatively move the cursor on the display panel according to a target motion vector generated according to the first motion vector and the second motion vector,*

*determine a inertial vector which has a speed and a direction from a start point of the first motion vector to an end point of the second motion vector, and*

*continuously move the cursor on the display panel by the inertial vector for a predetermined time after the indication object leaves, at the end point of the second motion vector, the touch pad.*

*11. The touch system as claimed in claim 10, wherein the speed is determined according to a variation of the first motion vector and the second motion vector.*

* * * * *